US011294771B1

(12) United States Patent
Chopra et al.

(10) Patent No.: US 11,294,771 B1
(45) Date of Patent: Apr. 5, 2022

(54) STORAGE OF DISCOVERED DATA OBJECT TO STORAGE LAYOUTS

(71) Applicant: EMC IP Holding Company LLC, Hopkinton, MA (US)

(72) Inventors: Shelesh Chopra, Bangalore (IN); John C. Rokicki, Hopkinton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 491 days.

(21) Appl. No.: 14/222,938

(22) Filed: Mar. 24, 2014

(51) Int. Cl.
*G06F 11/14* (2006.01)
*G06F 16/11* (2019.01)

(52) U.S. Cl.
CPC ........ *G06F 11/1458* (2013.01); *G06F 16/128* (2019.01); *G06F 11/1451* (2013.01); *G06F 11/1471* (2013.01)

(58) Field of Classification Search
CPC ............ G06F 11/1458; G06F 11/1451; G06F 11/1471; G06F 11/1402; G06F 16/128; H04L 67/10; H04L 67/1097
See application file for complete search history.

(56) References Cited

U.S. PATENT DOCUMENTS

| | | | | |
|---|---|---|---|---|
| 8,935,493 B1* | 1/2015 | Dolan | ................... | G06F 3/0649 711/161 |
| 9,690,791 B1* | 6/2017 | Chopra | ............... | G06F 11/1464 |
| 10,282,254 B1* | 5/2019 | Chopra | ............... | G06F 11/1402 |
| 10,437,783 B1* | 10/2019 | Cohen | ................. | G06F 11/1461 |
| 2002/0055972 A1* | 5/2002 | Weinman, Jr. | ...... | G06F 11/2058 709/203 |
| 2005/0108292 A1* | 5/2005 | Burton | ................... | G06F 3/0608 |
| 2006/0156228 A1* | 7/2006 | Gallo | ................... | G06F 3/0481 715/202 |
| 2007/0214196 A1* | 9/2007 | Garimella | ........... | G06F 11/1464 |
| 2008/0222198 A1* | 9/2008 | Wilkinson | ............ | G06F 8/4434 |
| 2010/0318497 A1* | 12/2010 | Price | ................... | G06F 11/1451 707/674 |
| 2010/0332454 A1* | 12/2010 | Prahlad | ............... | G06F 17/3002 707/654 |
| 2011/0197024 A1* | 8/2011 | Thomas | .............. | G06F 11/2094 711/114 |
| 2011/0302138 A1* | 12/2011 | Cesario | ............... | G06F 11/1464 707/640 |
| 2013/0132346 A1* | 5/2013 | Varadarajan | ........ | G06F 11/1448 707/639 |
| 2013/0282662 A1* | 10/2013 | Kumarasamy | .......... | G06F 11/14 707/649 |
| 2013/0339298 A1* | 12/2013 | Muller | .................... | G06F 16/90 707/640 |
| 2014/0055474 A1* | 2/2014 | Otala | ................ | G06F 17/30587 345/536 |
| 2014/0181441 A1* | 6/2014 | Kottomtharayil | ... | G06F 11/1458 711/162 |

(Continued)

*Primary Examiner* — Matthew J Ellis
(74) *Attorney, Agent, or Firm* — Dergosits & Noah LLP; Todd A. Noah

(57) ABSTRACT

Storage of discovered data object to storage layouts is described. A system receives a request to discover a data object to storage layout. The system determines if a discovery log stores a current data object to storage layout. The system provides a backup application with the current data object to storage layout in response to a determination that the discovery log stores the current data object to storage layout.

19 Claims, 4 Drawing Sheets

(56) References Cited

U.S. PATENT DOCUMENTS

2015/0006910 A1* 1/2015 Shapiro .............. G06F 12/1408
 713/190
2015/0212893 A1* 7/2015 Pawar ................. G06F 11/1448
 707/649

* cited by examiner

300

| File System 302 | Volume Name 304 | Disk 306 | LUN ID 308 | Array 310 |
|---|---|---|---|---|
| /volume1 | Vxvol1 | Disk1, Disk2 | 123, 124 | APMXXX |
| /volume2 | Vxvol2 | Disk3, Disk4 | 111, 112 | APMXXX |
| /volume3 | Vxvol5 | Disk5, Disk6 | 222, 223 | APMYYY |
| /volume4 | Vxvol6 | Disk7, Disk8 | 224, 225 | APMYYY |

FIG. 3

STORAGE OF DISCOVERED DATA OBJECT TO STORAGE LAYOUTS

BACKGROUND

If a software error corrupts a data object, or if erroneous data updates the data object, a data protection administrator may restore the data object to a previous uncorrupted state that does not include the corrupted or erroneous data. A backup application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup application to execute a restore operation to restore a copy of the corresponding backup files for that state to the data object.

A snapshot is a capture of a state of a data object, such as a file system or an application, at a specific moment in time. A file system may be stored on a storage array, which is a disk storage system which includes multiple disk drives. Unlike a disk enclosure, a storage array has cache memory and advanced functionality, such as virtualization and Redundant Array of Independent Disks (RAID). An enterprise may have a data protection administrator to manage a backup application to create snapshots of data objects stored on multiple storage arrays.

Snapshot and replication operations of application data are key strategies to meet demanding Service Level Objectives (SLO) such as Recovery Point Objectives (RPO) and Recovery Time Objectives (RTO). Snapshots have changed the way that backups are perceived and led to a paradigm shift in the domain of backups. Snapshots are a mechanism that can drastically reduce the time required for backing up a data object, which may be referred to as a backup window, which may enable achievement of aggressive Service Level Agreements (SLA) that many businesses demand.

BRIEF DESCRIPTION OF THE DRAWINGS

FIG. 3 is a screen shot illustrating example data for storage of discovered data object to storage layouts, under an embodiment.

DETAILED DESCRIPTION

When using snapshots methodologies to provide backups, one requirement that significantly increases the backup window is the discovery of a data object to storage layout. Although a snapshot in itself is very quick, discovering a data object to storage layout is still a legacy process that is very slow. For example, if a backup operation is required for Volume XYZ, a legacy backup application discovers the storage layout for the Volume XYZ by parsing the Volume XYZ through a volume manager, mapping the Volume XYZ to its corresponding disks, mapping the corresponding disks to storage array logical unit number (LUN) identifiers, and initiating the backup/snapshots of those LUNs. While such layout discovery is mandatory, the bigger challenge is that this layout discovery happens every single time that a backup is required, even if nothing has changed in the data object to storage layout since the previous layout discovery. Unnecessary layout discoveries cause latency, slowness, challenges to scalability, the waste of system resources such as memory and time, and the potential failing of requirements for service level agreements, all of which lead to a lower total customer experience.

Embodiments herein provide storage of discovered data object to storage layouts. A system receives a request to discover a data object to storage layout. For example, a backup application requests a discovery tool to discover a file system /volume1 to storage array layout. The system determines if a discovery log stores a current data object to storage layout. For example, the discovery tool determines whether a discovery log stores the current file system /volume1 to storage array layout. The system provides a backup application with the current data object to storage layout in response to a determination that the discovery log stores the current data object to storage layout. For example, the discovery tool provides the backup application with the current file system /volume1 to storage array layout stored in the discovery log, which the discovery log had stored on a previous occasion when the discovery tool discovered the current file system /volume1 to storage array layout. The discovery tool does not have to spend time and system resources to re-discover the data object to storage layout that the discovery tool already discovered, thereby enabling the discovery tool to overcome challenges in the legacy discovery process. Therefore, discovery of a data object to storage layout may occur once only in many circumstances. The conservation of system time and resources results in a faster completion of backups, which enables the system to meet more aggressive timelines of service level agreements, and to efficiently handle more snapshots during the same amount of time, which results in a higher total customer experience.

Figure 1:
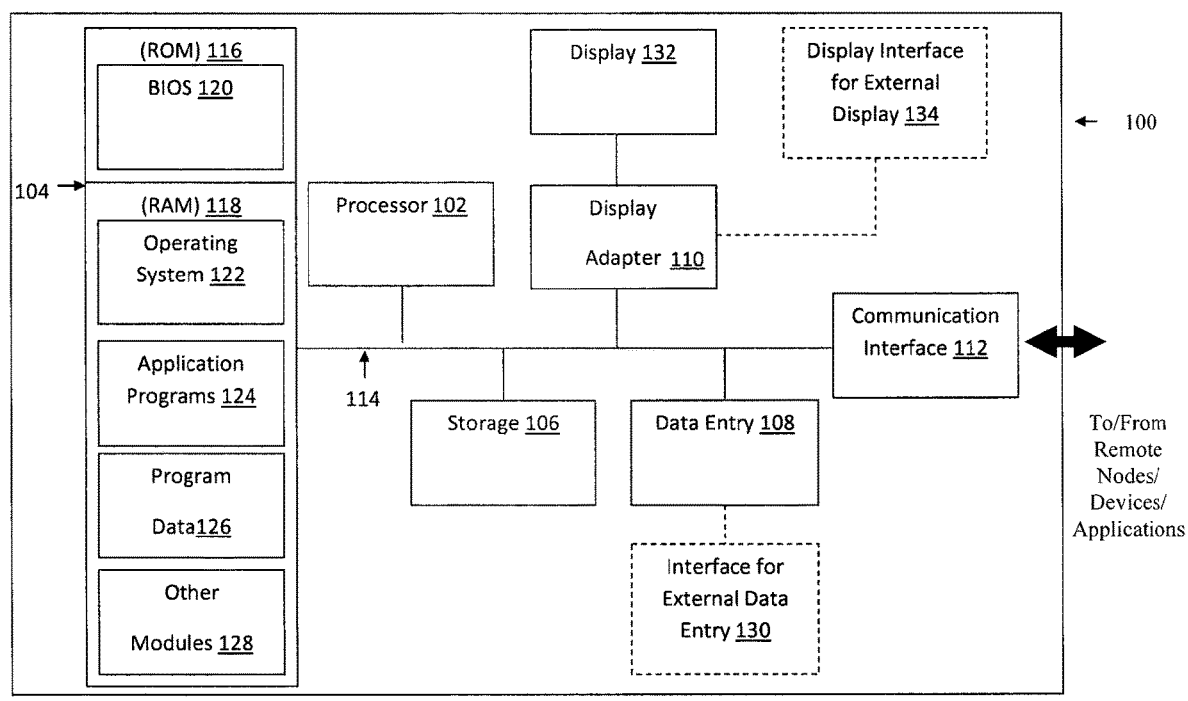
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for storage of discovered data object to storage layouts.

In the prior art, unnecessary discoveries cause latency, slowness, challenges to scalability, the waste of system resources such as memory and time, and potential failing of requirements for service level agreements, all of which lead to a lower total customer experience. Embodiments herein enable storage of discovered data object to storage layouts. A discovery tool does not have to spend time and system resources to re-discover a data object to storage layout that the discovery tool already discovered, thereby enabling the discovery tool to overcome challenges in the legacy discovery process.

Figure 2:
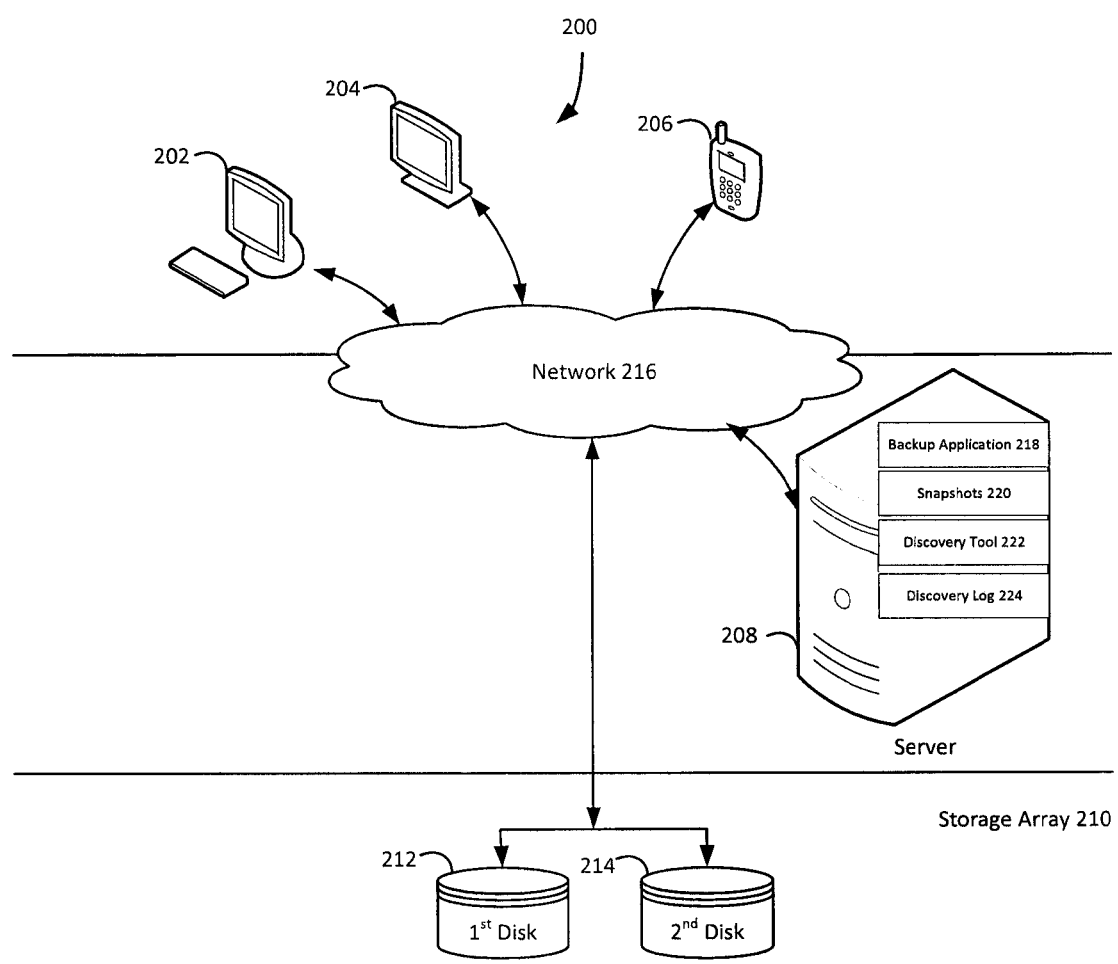
FIG. 2 illustrates a block diagram of an example system for storage of discovered data object to storage layouts, under an embodiment.

FIG. 2 illustrates a block diagram of a system that implements storage of discovered data object to storage layouts, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a server 208 and a storage array 210 that may be provided by a hosting company. The storage array 210 includes a first disk 212 and a second disk 214. The clients 202-206, the server 208, and the storage array 210 communicate via a network 216. Although FIG. 2 depicts the system 200 with three clients 202-206, one server 208, one storage array 210, two disks 212-214, and one network 216, the system 200 may include any number of clients 202-206, servers 208, storage arrays 210, disks 212-214, and networks 216. The clients 202-206 and the server 208 may each be substantially similar to the system 100 depicted in FIG. 1.

The server 208 includes a backup application 218, snapshots 220, a discovery tool 222, and a discovery log 224. The backup application 218 creates the snapshots 220 of data objects for the clients 202-206 and/or the server 208, and stores the snapshots 220 on the server 208. The system 200 enables the backup application 218 to execute a rollback based on snapshots 220. FIG. 2 depicts the system elements 218-224 residing completely on the server 208, but the system elements 218-224 may reside completely on the server 204, completely on the clients 202-206, completely on another server that is not depicted in FIG. 2, or in any combination of partially on the server 208, partially on the clients 202-206, and partially on the other server.

The backup application 218 may be, for example, EMC Corporation's Networker® backup application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers. Although the functionality examples described in this paragraph apply to EMC Corporation's NetWorker® backup application, one of skill in the art would recognize that other backup applications and their corresponding functionalities may be used.

The backup application 218 requests the discovery tool 222 to discover a data object to storage layout. For example, the backup application 218 requests the discovery tool 222 to discover a layout of a file system /volume1 for the clients 202-206 to the storage array 210. In response to the request, the discovery tool 222 determines whether the discovery log 224 stores a current data object to storage layout. For example, the discovery tool 222 determines whether the discovery log 224 already stores the current layout for the file system /volume1 to the storage array 210, such that an additional discovery would be unnecessary and wasteful. The discovery log 224 may be any open source database that may store discovered layouts, and possibly also store timestamps for the discovered layouts. If the discovery tool 222 determines that the discovery log 224 does not store the current data object to storage array layout, the discovery tool 222 initiates discovery of the current data object to storage array layout. However, if the discovery tool 222 determines that the discovery log 224 already stores the current data object to storage array layout, the discovery tool 222 does not need to expend system resources on the discovery of the current data object to storage array layout because the current data object to storage array layout was already discovered on a previous occasion.

The discovery tool 222 may discover a current data object to storage layout in response to a determination that the discovery log 224 does not store a current data object to storage layout. For example, the discovery tool 222 discovers the current layout of the file system /volume1 to the storage array 210 because the current layout of the file system /volume1 to the storage array 210 was not already stored in the discovery log 224. The discovery tool 222 may store the recently discovered current data object to storage layout in the discovery log 224. For example, the discovery tool 222 stores the recently discovered current layout of the file system /volume1 to the storage array 210 in the discovery log 224, which may provide the layout of the file system /volume1 to the storage array 210 in response to future discovery requests.

The discovery tool 222 provides the backup application 218 with a current data object to storage layout. For example, the discovery tool 222 provides the backup application 218 with the current layout of the file system /volume1 to the storage array 210, which is stored in the discovery log 224. The discovery log 224 had stored the current file system /volume1 to storage array layout either on a previous occasion when the discovery tool 222 previously discovered the current file system /volume 1 to storage array layout or in response to the recent discovery of the layout that followed the recent determination that the discovery log 224 did not store the current file system /volume1 to storage array layout.

The discovery tool 222 may also discover an updated data object to storage layout in response to a scheduled discovery, a user request for discovery, and/or a system event. For example, the discovery tool 222 discovers an updated layout of the file system /volume1 to the storage array 210 because the discovery tool 222 detected the addition of an additional disk for the file system/voulme1, thereby changing the size of /volume1. A system event may be a user purging a mapping of a data object to storage, a small computer system interface reset, a host reboot, a storage area network reconfiguration, a migration, a cluster failover, a volume size change, a re-initialization of a storage subsystem, and/or a re-hosting of a host bus adapter. A system user such as a data protection administrator can define the logic when to rediscover the layout.

Re-discovery of the layout can be also schedule based, such as a scheduled layout discovery once a week, or a discover layout now. The discovery tool 222 may function as a watchdog which monitors different changes and can delete or overwrite the previously discovered layouts in discovery log 224 based on system events and/or pre-set conditions. The discovery tool 222 may store a recently discovered updated data object to storage layout in the discovery log 224 in response to a scheduled discovery, a user request for discovery, and/or a system event. For example, the discovery tool 222 stores the updated layout of the file system /volume1 to the storage array 210, based on the recent increase in size in the file system /volume1, in the discovery log 224.

The discovery log 224 may store a timestamp associated with a current data object to storage layout, and the discovery tool 222 may use a timestamp to confirm that the discovery log 224 stores an updated data object to storage layout after a system event, a scheduled discovery, and/or a user request for discovery. For example, the discovery tool 222 uses a timestamp stored with the updated layout of the file system /volume1 to the storage array 210 to verify that the layout for the file system /volume 1 was re-discovered following the re-sizing of /volume 1 on the morning Jan. 1, 2014. Each action of discovery tool 222 may be tracked in a different schema for further auditing/references. Discovery of a data object to storage layout may occur once only in many circumstances.

FIG. 3 illustrates example data for storage of discovered data object to storage layouts, under an embodiment. The data 300 includes a file system 302 column, a volume name 304 column, a disk 306 column, a LUN (logical unit number) ID (identifier) 308 column, and an array 310 column. Although not depicted in FIG. 3, the data 300 may include any number and types of additional rows and additional columns, such as a timestamp column. The first data row of the data 300 indicates that the file system /volume1 is a volume named Vxvol1, which stores its data in a storage array named APMXXX, which uses Disk1 and Disk 2 for storage, which are identified by the LUN IDs 123 and 124. When the discovery tool 222 receives a request to snapshot multiple save sets, such as /volume1, /volume2, /volume3, and /volume4 depicted in the data 300, the discovery tool 222 only needs to discover the layouts which discovery log 224 is missing and/or the layouts which have timestamps that indicate that rediscovery of the layout is required.

Figure 4:
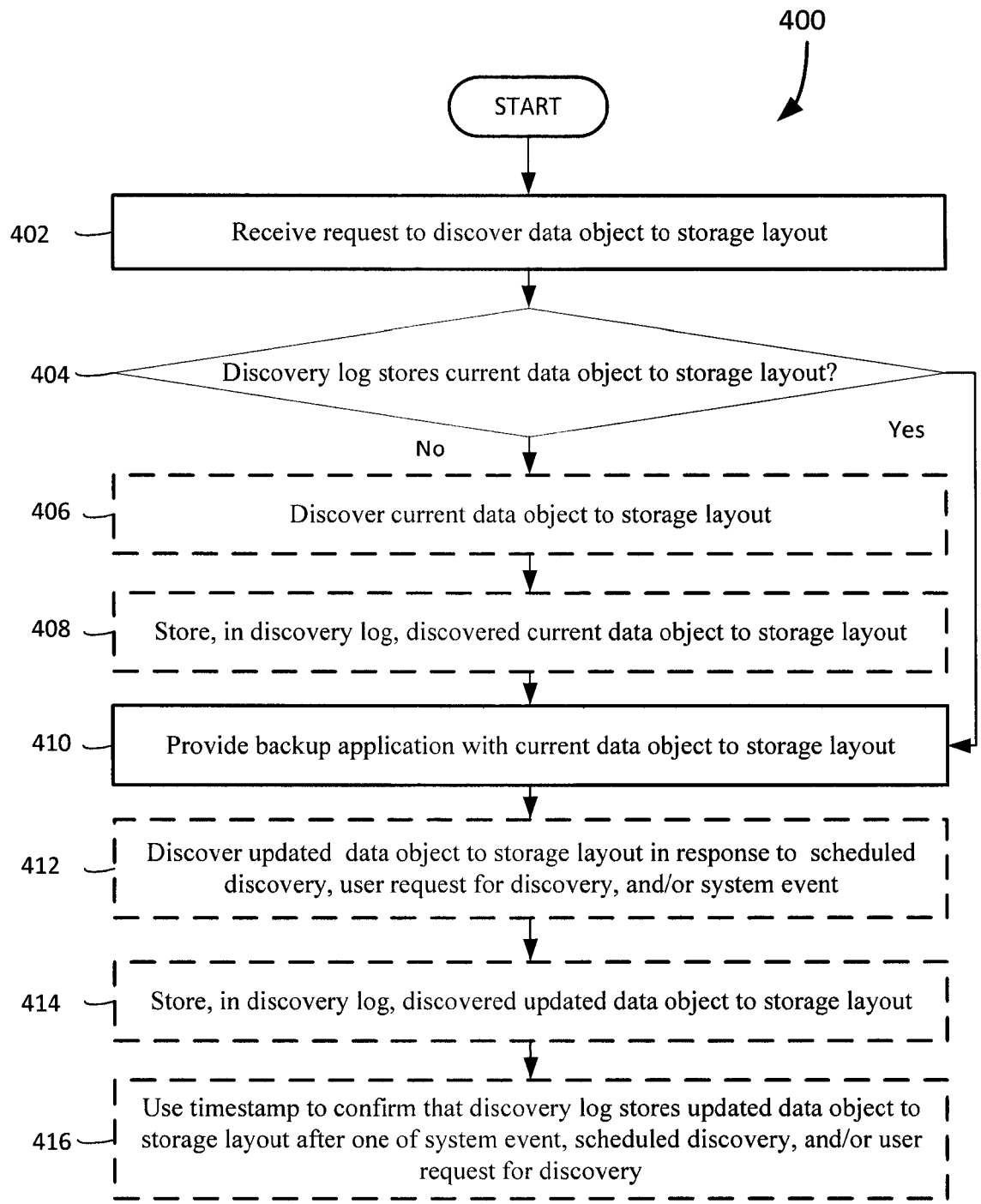
FIG. 4 is a flowchart that illustrates a method of storage of discovered data object to storage layouts, under an embodiment.

FIG. 4 is a flowchart that illustrates a method for storage of discovered data object to storage layouts, under an embodiment. Flowchart 400 illustrates method acts illustrated as flowchart blocks for certain steps involved in and/or between the clients 202-206 and/or the server 208 of FIG. 2.

A request is received to discover a data object to storage layout, block 402. For example, the backup application 218 requests the discovery tool 222 to discover a layout of a file system /volume1 for the clients 202-206 to the storage array 210.

A determination is made whether a discovery log stores a current data object to storage layout, block 404. For example, the discovery tool 222 determines whether the discovery log 224 stores the current layout for the file system /volume1 to the storage array 210. If the discovery log does not store the current data object to storage array layout, the flowchart 400 continues to block 406. If the discovery log stores the current data object to storage array layout, the flowchart 400 proceeds to block 410.

A current data object to storage layout is optionally discovered in response to a determination that a discovery log does not store a current data object to storage layout, block 406. For example, the discovery tool 222 discovers the current layout of the file system /volume1 to the storage array 210, which was not stored in the discovery log 224.

A discovered current data object to storage layout is optionally stored in a discovery log, block 408. For example, the discovery tool 222 stores the current layout of the file system /volume1 to the storage array 210 in the discovery log 224.

A backup application is provided with a current data object to storage layout, block 410. For example, the discovery tool 222 provides the backup application 218 with the current layout of the file system /volume1 to the storage array 210, which is stored in the discovery log 224. The discovery log 224 had stored the current file system /volume1 to storage array layout either on a previous occasion when the system 200 previously discovered the current file system /volume1 to storage array layout or in response to the recent discovery of the layout that followed a recent determination that the discovery log 224 did not store the current the current file system /volume1 to storage array layout.

An updated data object to storage layout is optionally discovered in response to a scheduled discovery, a user request for discovery, and/or a system event, block 412. For example, the discovery tool 222 discovers an updated layout of the file system /volume1 to the storage array 210 because the discovery tool 222 detected the addition of an additional disk for the file system/voulme1, thereby changing the size of /volume1.

A discovered updated data object to storage layout is optionally stored in a discovery log, block 414. For example, the discovery tool 222 stores the updated layout of the file system /volume1 to the storage array 210, based on the recent increase in size in the file system /volume1, in the discovery log 224.

A timestamp is used to confirm that a discovery log stores an updated data object to storage layout after a system event, a scheduled discovery, and/or a user request for discovery block 416. For example, the discovery tool 222 uses a timestamp stored with the updated layout of the file system /volume1 to the storage array 210 to verify that the layout for the file system /volume 1 was re-discovered following the re-sizing of /volume1 on the morning Jan. 1, 2014. The conservation of system time and resources results in a faster completion of backups, which enables the system 200 to meet more aggressive timelines of service level agreements, and to efficiently handle more snapshots during the same amount of time, which results in a higher total customer experience.

Although FIG. 4 depicts the blocks 402-416 occurring in a specific order, the blocks 402-416 may occur in another order. In other implementations, each of the blocks 402-416 may also be executed in combination with other blocks and/or some blocks may be divided into a different set of blocks.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for storage of discovered data object to storage layouts, the system comprising:
   one or more processors;
   a non-transitory computer-readable medium storing a plurality of instructions, which when executed, cause the one or more processors to:
   receive a first request to discover a data object-to-storage layout for a data object;
   generate the data object-to-storage layout by mapping from a volume associated with a data object to a corresponding storage storing the data object, the corresponding storage being associated with a storage array that comprises a storage device associated with a logical unit number identifier, the data object-to-storage layout to be used to initialize creation of a snapshot of the data object;
   store, in a discovery log, the data object-to-storage layout for the data object and a timestamp associated with the discovered data object-to-storage layout in response receiving the first request;
   receive a second request to discover the layout of the data object-to-storage during a backup window for the data object;
   determine, in response to receiving the second request, whether the data object-to-storage layout stored in the discovery log is a current data-to-storage layout of the data object by comparing the timestamp associated with the data object-to-storage layout from the discovery log with a time associated with at least a latest one of a scheduled discovery of the data object-to-storage layout, a request for discovery of the data object-to-storage layout, and a system event;
   provide a backup application with the current layout from the discovery log, in response to a determination that the discovery log stores the current layout;
   respond, in response to a determination that the discovery log does not store the current layout, to the request to discover the layout by discovering the current layout, through performing a mapping a volume associated with the data object to at least one corresponding storage device storing the data object, by storing the performed mapping as the current layout in the discovery log, and by providing the backup application with the current layout from the discovery log.

2. The system of claim 1, wherein the data object comprises one of a file system and an application.

3. The system of claim 1, wherein the instructions, when executed further cause the one or more processors to:
   discover an updated layout of the data object to the corresponding storage in response to the system event; and
   store, in the discovery log, the discovered updated layout.

4. The system of claim 3, wherein the system event comprises at least one of a user purging a mapping of a data object to storage, a small computer system interface reset, a host reboot, a storage area network reconfiguration, a migration, a cluster failover, a volume size change, a re-initialization of a storage subsystem, and a re-hosting of a host bus adapter.

5. The system of claim 1, wherein the instructions, when executed further cause the one or more processors to:
   discover an updated layout in response to at least one of a scheduled discovery and a user request for discovery; and
   store, in the discovery log, the discovered updated layout.

6. The system of claim 1, wherein the discovery log stores a timestamp associated with the current layout, and wherein the instructions, when executed further cause the one or more processors to use the timestamp to confirm that the discovery log stores an updated layout after one of the system event, a scheduled discovery, and a user request for discovery.

7. A computer-implemented method for storage of discovered data object to storage layouts, the method comprising:
   receiving a first request to discover a data object-to-storage layout for a data object;
   generating the data object-to-storage layout by mapping from a volume associated with a data object to a corresponding storage storing the data object, the corresponding storage being associated with a storage array that comprises a storage device associated with a logical unit number identifier, the data object-to-storage layout to be used to initialize creation of a snapshot of the data object;
   storing, in a discovery log, the data object-to-storage layout for the data object and a timestamp associated with the discovery of the data object-to-storage layout in response receiving the first request;

receiving a second request to discover the layout of the data object-to-storage during a backup window for the data object;

determining, in response to receiving the second request, whether the data object-to-storage layout stored in the discovery log is a current data-to-storage layout of the data object by comparing the timestamp associated with the data object-to-storage layout from the discovery log with a time associated with at least a latest one of a scheduled discovery of the data object-to-storage layout, a request for discovery of the data object-to-storage layout, and a system event;

provide a backup application with the current layout from the discovery log, in response to a determination that the discovery log stores the current layout;

responding, in response to a determination that the discovery log does not store the current layout, to the request to discover the layout by discovering the current layout, through mapping a volume associated with the data object to at least one corresponding storage device storing the data object, by storing the current layout in the discovery log, and by providing the backup application with the current layout from the discovery log.

8. The method of claim 7, wherein the data object comprises one of a file system and an application.

9. The method of claim 7, wherein the method further comprises:

discovering an updated layout in response to at least one of a scheduled discovery, a user request for discovery, and the system event; and storing, in the discovery log, the discovered updated layout.

10. The method of claim 9, wherein the system event comprises at least one of a user purging a mapping of a data object to storage, a small computer system interface reset, a host reboot, a storage area network reconfiguration, a migration, a cluster failover, a volume size change, a re-initialization of a storage subsystem, and a re-hosting of a host bus adapter.

11. The method of claim 7, wherein the discovery log stores a timestamp associated with the current layout, and wherein the method further comprises using the timestamp to confirm that the discovery log stores an updated layout after one of the system event, a scheduled discovery, and a user request for discovery.

12. A computer program product, comprising a non-transitory computer-readable medium having a computer-readable program code embodied therein to be executed by one or more processors, the program code including instructions to:

receive a first request to discover a data object-to-storage layout for a data object;

generate the data object-to-storage layout by mapping from a volume associated with a data object to a corresponding storage storing the data object, the corresponding storage being associated with a storage array that comprises a storage device associated with a logical unit number identifier, the data object-to-storage layout to be used to initialize creation of a snapshot of the data object;

store, in a discovery log, the data object-to-storage layout for the data object and a timestamp associated with the discovery of the data object-to-storage layout in response receiving the first request;

receive a second request to discover the layout of the data object-to-storage during a backup window for the data object;

determine, in response to receiving the second request, whether the data object-to-storage layout stored in the discovery log is a current data-to-storage layout of the data object by comparing the timestamp associated with the data object-to-storage layout from the discovery log with a time associated with at least a latest one of a scheduled discovery of the data object-to-storage layout, a request for discovery of the data object-to-storage layout, and a system event;

provide a backup application with the current layout from the discovery log, in response to a determination that the discovery log stores the current layout;

respond, in response to a determination that the discovery log does not store the current layout, to the request to discover the layout by discovering the current layout, through mapping a volume associated with the data object to at least one corresponding storage device storing the data object, by storing the current layout in the discovery log, and by providing the backup application with the current layout from the discovery log.

13. The computer program product of claim 12, wherein the data object comprises one of a file system and an application.

14. The computer program product of claim 12, wherein the program code includes further instructions to:

discover an updated layout in response to the system event; and store, in the discovery log, the discovered updated layout.

15. The computer program product of claim 14, wherein the system event comprises at least one of a user purging a mapping of a data object to storage, a small computer system interface reset, a host reboot, a storage area network reconfiguration, a migration, a cluster failover, a volume size change, a re-initialization of a storage subsystem, and a re-hosting of a host bus adapter.

16. The computer program product of claim 12, wherein the program code includes further instructions to:

discover an updated layout in response to at least one of a scheduled discovery and a user request for discovery; and store, in the discovery log, the discovered updated layout.

17. The computer program product of claim 12, wherein the discovery log stores a timestamp associated with the current layout, and wherein the program code includes further instructions to use the timestamp to confirm that the discovery log stores an updated layout after one of the system event, a scheduled discovery, and a user request for discovery.

18. The system of claim 1, wherein the mapping from the data object to the at least one corresponding storage device comprises parsing the data object through a volume manager, mapping data object to its corresponding disks, mapping the corresponding disks to one or more storage array logical unit (LUN) identifiers, and initiating backup snapshots for the one or more storage array logical unit (LUN) identifiers.

19. The system of claim 1, wherein verifying whether the current layout was updated after any modifications to the volume associated with the data object includes determining, without accessing the current layout, a timestamp associated with the current layout is after a most recent modification to the volume associated with the data object.

* * * * *